United States Patent
Creel et al.

(10) Patent No.: US 12,016,324 B2
(45) Date of Patent: Jun. 25, 2024

(54) GATE FOR HOG TRAP

(71) Applicants: Bobby Glen Creel, Jonesville, LA (US); Tyler Glen Creel, Harrisonburg, LA (US)

(72) Inventors: Bobby Glen Creel, Jonesville, LA (US); Tyler Glen Creel, Harrisonburg, LA (US)

( * ) Notice: Subject to any disclaimer, the term of this patent is extended or adjusted under 35 U.S.C. 154(b) by 16 days.

(21) Appl. No.: 18/113,959

(22) Filed: Feb. 24, 2023

(65) Prior Publication Data
US 2023/0263151 A1 Aug. 24, 2023

Related U.S. Application Data

(60) Provisional application No. 63/372,227, filed on Feb. 24, 2022.

(51) Int. Cl.
*A01M 23/18* (2006.01)
*A01M 23/08* (2006.01)

(52) U.S. Cl.
CPC ............ *A01M 23/18* (2013.01); *A01M 23/08* (2013.01)

(58) Field of Classification Search
CPC .............................. A01M 23/08; A01M 23/18
See application file for complete search history.

(56) References Cited

U.S. PATENT DOCUMENTS

| | | | | |
|---|---|---|---|---|
| 3,991,508 | A | * | 11/1976 | Petrosky ............... A01M 23/08 43/66 |
| 4,779,373 | A | * | 10/1988 | Krenson ................ A01K 31/24 43/61 |
| 6,772,555 | B2 | | 8/2004 | Evans et al. |
| 7,854,088 | B2 | | 12/2010 | Kurachi |
| 7,866,086 | B2 | * | 1/2011 | Murchison ............ A01M 23/08 43/61 |
| 8,061,076 | B2 | | 11/2011 | Kelley |
| 9,668,467 | B2 | | 6/2017 | Gaskamp et al. |
| 10,085,439 | B1 | | 10/2018 | Uhlik |
| 10,602,736 | B2 | | 3/2020 | Wilson |
| 11,185,065 | B2 | * | 11/2021 | DeNicola ............... A01M 23/08 |

OTHER PUBLICATIONS

Voorhies Hog Trapping Gate, from Tractor Supply website, https://www.tractorsupply.com/tsc/product/hog-trapping-gate, 1 page (2014).

* cited by examiner

*Primary Examiner* — Richard G Davis
(74) *Attorney, Agent, or Firm* — Warner J. Delaune; Phelps Dunbar LLP

(57) ABSTRACT

A gate for a feral hog trap is provided, comprising a frame having side frame assemblies, a top member, and a reinforcing member. Netting material is secured across the side frame assemblies and across the front of the frame. The netting material is attached to the frame using ropes which are secured to the frame members. The front netting material remains loosely gathered along a bottom edge and is preferably weighted to keep the bottom edge in contact with the ground. When feral hogs enter the gate, they pass under the front netting such that the netting falls back to the ground, making it difficult for the feral hogs to exit the gate as they step on the bottom edge of the front netting.

6 Claims, 7 Drawing Sheets

GATE FOR HOG TRAP

CROSS-REFERENCE TO RELATED APPLICATIONS

This nonprovisional patent application claims the benefit of priority under 35 U.S.C. 119(e) to provisional patent application U.S. 63/372,227 filed on Feb. 24, 2022.

BACKGROUND OF THE INVENTION

1. Field of the Invention

The present invention relates to generally to devices and methods used to trap animals, and more particularly to gates used to allow entry of feral hogs into such traps while preventing their escape from such traps.

2. Background Information and Prior Art

The overpopulation of wild animals, such as wild or feral hogs, is well known. Feral hogs may damage trees, vegetation, agricultural crops, and other property. The extent of property damage associated with feral hogs has been estimated to be as high as $800 million to over $1 billion annually in the United States alone. In addition, feral hogs may prey on domestic animals such as pets and livestock, and may injure other animal populations by hunting them, destroying their habitat, and spreading disease.

Mature feral hogs in the United States may be as tall as 36 inches and weigh from 100 to 400 lbs. Feral hog populations are also growing in astounding numbers, because they have a relatively short gestation period and a large number of piglets in each litter. For example, sows can produce up to ten or more piglets per litter and may produce two litters per year. Piglets reach sexual maturity at six months of age, allowing the hog population to quickly reach a state of overpopulation.

Because feral hogs are so numerous and have few natural predators, in some areas it is desirable to artificially control their populations by trapping them. However, feral hogs are difficult to trap because they are relatively intelligent, have keen senses of hearing and smell, and quickly become suspicious of traps. In addition to being difficult to trap, the hogs' bulk and strength may render many traps unsuitable for capturing and holding multiple hogs.

A number of feral hog or animal traps and trapping systems exist today. Many trap designs are intended to trap one or only a small number of animals, commonly, animal-actuated traps. These traps are largely ineffective in controlling or impacting exploding feral animal populations. A smaller number of trap designs provide for a large corral-like structure to be constructed with the intention of capturing larger numbers of feral animals; however, these traps require considerable space, time and effort to construct and deconstruct. And, while such structures may be assembled on site, they are not readily portable. Given the fixed nature of these corral-systems (which include fixed panels that extend up from the ground), these systems typically require many days of visiting the site, baiting and training animals to overcome their suspicion. Lastly, there are a very small number of suspended trap systems that include animal-actuated systems (which have limited effectiveness) and/or require heavy-duty lift systems that require impractical or costly structures or complex cabling/pulleys as well as considerable applications of force to achieve the raising and maintenance of a suspended trap above a trap site.

One example of a hog trap is disclosed in U.S. Pat. No. 11,185,065, which shows a trap assembly that relies on an inwardly oriented netting arrangement. Hogs enter the trap area by slipping under the netting and find it difficult to exit, because of the inclination of the netting and because the hogs tend to step on the netting itself as they push against the netting. While this method of keeping hogs within the trap area is effective, it is intended to be used for the entire trap area, rather than a single gate for entry. To reduce the costs and assembly time, it would be desirable to use conventional metal fencing and posts for most of the trap area, but provide a single gate based on the present invention to allow the hogs to enter.

Another example of a hog trapping device is the Voorhies 3-Door Hog Trapping Gate sold by Tractor Supply Company. While this Voorhies gate does allow use with conventional metal fencing and posts, its design is mechanically complex, requires hinged components, employs a metal wire mesh, and can be noisy. For example, when hogs approach this gate, they are met with a metal wire mesh that provides more resistance than needed, causing some hogs to avoid the hard trap doors. Also, the metal trap doors tend to create hinging noises and can fall loudly, causing other hogs to fear the gate and fail to enter.

Therefore, a further need exists for a simple, inexpensive, easily assembled, and effective hog gate that quietly allows hogs to enter the trap area with minimal resistance across a continuous netting, while at the same time making it difficult for the hogs to exit the gate, because they cannot lift the bottom edge of the loosely gathered and weighted front netting as they are simultaneously stepping on the bottom edge of the front netting. Such a gate enables use with less expensive conventional metal fence materials and posts which can be more easily obtained.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Figure 1:
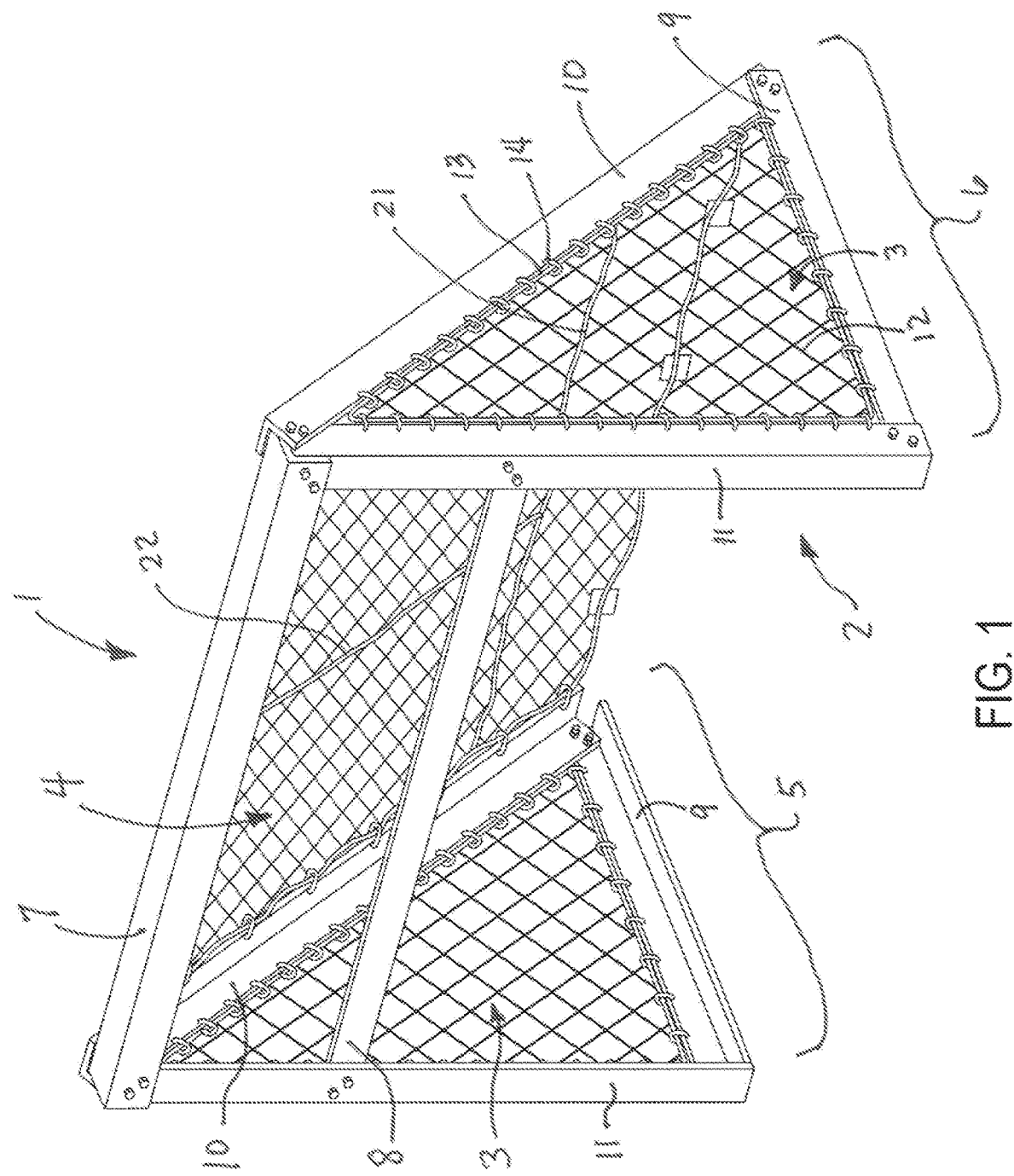
FIG. 1 shows a perspective view of a preferred embodiment of the hog gate of the present invention.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Turning now to the figures, a preferred embodiment of the present invention is shown in FIGS. 1-7. The invention is a gate 1 for a feral hog trap, generally comprising a frame 2, a side netting assembly 3, and a front netting assembly 4.

With respect to the frame 2 itself, the frame 2 is constructed from opposing side frame assemblies 5, 6 attached to one another by a top member 7 and a reinforcing member 8. Each side frame assembly 5, 6 has a triangular shape and includes a bottom member 9, a front member 10, and a rear member 11. The top member 7 extends between the side frame assemblies 5, 6, while the reinforcing member 8 extends between the side frame assemblies 5, 6 and below the top member 7. All of the frame members are L-shaped (angle) members or bar members well known in the art, and they are attached to one another using conventional bolt and nut fasteners as shown generally in FIGS. 1, 5, 6, and 7. This fastening methods permits easy and efficient shipping of the frame components in a disassembled state to the user, and which can be quickly assembled at the site where the feral hogs are to be trapped. Alternatively, the gate 1 can be preassembled and then transported in its assembled state to the trapping site via truck or other utility vehicle.

With respect to the side netting assembly 3, it is secured across each of the side frame assemblies 5, 6, wherein the side netting assembly 3 includes a flexible side netting material 12, such as nylon netting, having a plurality of openings of no greater than about 3-4 inches across per opening. The side netting material 12 has a triangular shape adapted to extend between the bottom member 9, the front member 10, and the rear member 11 of each of the side frame assemblies 5, 6. Depending on the strength of the netting employed, one layer of netting 12 may be suitable, although preferably, there should be two layers of netting 12 for additional strength and durability in view of the tendency of feral hogs to try and chew through the netting material 12.

A side netting rope 13 is weaved into the peripheral openings of the triangular side netting material 12, and the side netting rope 13 is secured to the bottom member 9, the front member 10, and the rear member 11 of each of the side frame assemblies 5,6 as will be explained. Once weaved into the netting 12, the ends of the side netting rope 13 are secured to one another such that the entire periphery of the side netting assembly 3 is continuously supported by the side netting rope 13. Next, the side netting rope 13 of each of the side netting assemblies 3 is secured to the respective side frame assemblies 5, 6 using a plurality of clamps 14 engaged with holes 15 formed into the bottom member 9, the front member 10, and the rear member 11. Preferably, the clamps 14 used to secure the side netting assembly 3 to the frame should be spaced no greater than about 5-6 inches apart. When fully assembled, the sides of the gate 1 are strong enough to withstand attempts by the entrapped hogs to break through the sides of the gate 1.

Similarly, the gate 1 includes a front netting assembly 4 secured across the side frame assemblies 5, 6. The front netting assembly 4 includes a flexible front netting material 16, preferably two layers of nylon netting having a plurality of openings similar to the side netting material 12. The front netting material 16 has a rectangular shape adapted to extend between the front members 10 of the side frame assemblies 5, 6 and the top member 7. The front netting assembly 16 includes a bottom edge 17 in contact with the ground. Similar to the side netting assemblies 5, 6, a front netting rope 18 is weaved into the openings of the front netting material 16, wherein the front netting rope 18 is secured to the top member 7 and the front members 10 of the side frame assemblies 5, 6 as will be explained. Once weaved into the front netting material 16, the ends of the front netting rope 18 are secured to one another such that the entire periphery of the front netting assembly 4 is continuously supported by the front netting rope 18. Next, the front netting rope 18 is secured to the respective side frame assemblies 5, 6 and the top member 7 using a plurality of clamps 14 engaged with holes 15 formed into the top member 7 and the front members 10. Preferably, the clamps 14 used to secure the front netting assembly 4 to the frame should be spaced no greater than about 5-6 inches apart. When fully assembled, the bottom edge 17 of the front netting assembly should be constructed in a way to allow the bottom edge 17 to remain loosely gathered and in contact with the ground. Preferably, the bottom edge 17 of the front netting assembly 4 includes additional weighted material 19 secured to the front netting rope 18 sufficient to keep the bottom edge 17 in contact with the ground. Thus, the looseness of the bottom edge 17, when inclined inwardly toward the center of the trapping enclosure as the hogs enter the gate 1, causes the hogs to step on the front netting assembly 4 and the bottom edge 17 as they attempt to escape. In other words, the hogs will try to root underneath the bottom edge 17, but will have great difficulty doing so because they are standing on top of the loosely gathered netting at the same time. The more they try to push through the netting, the more the bottom edge 17 tends to remain in place as they continue to step on it in their escape attempts.

Figure 3:
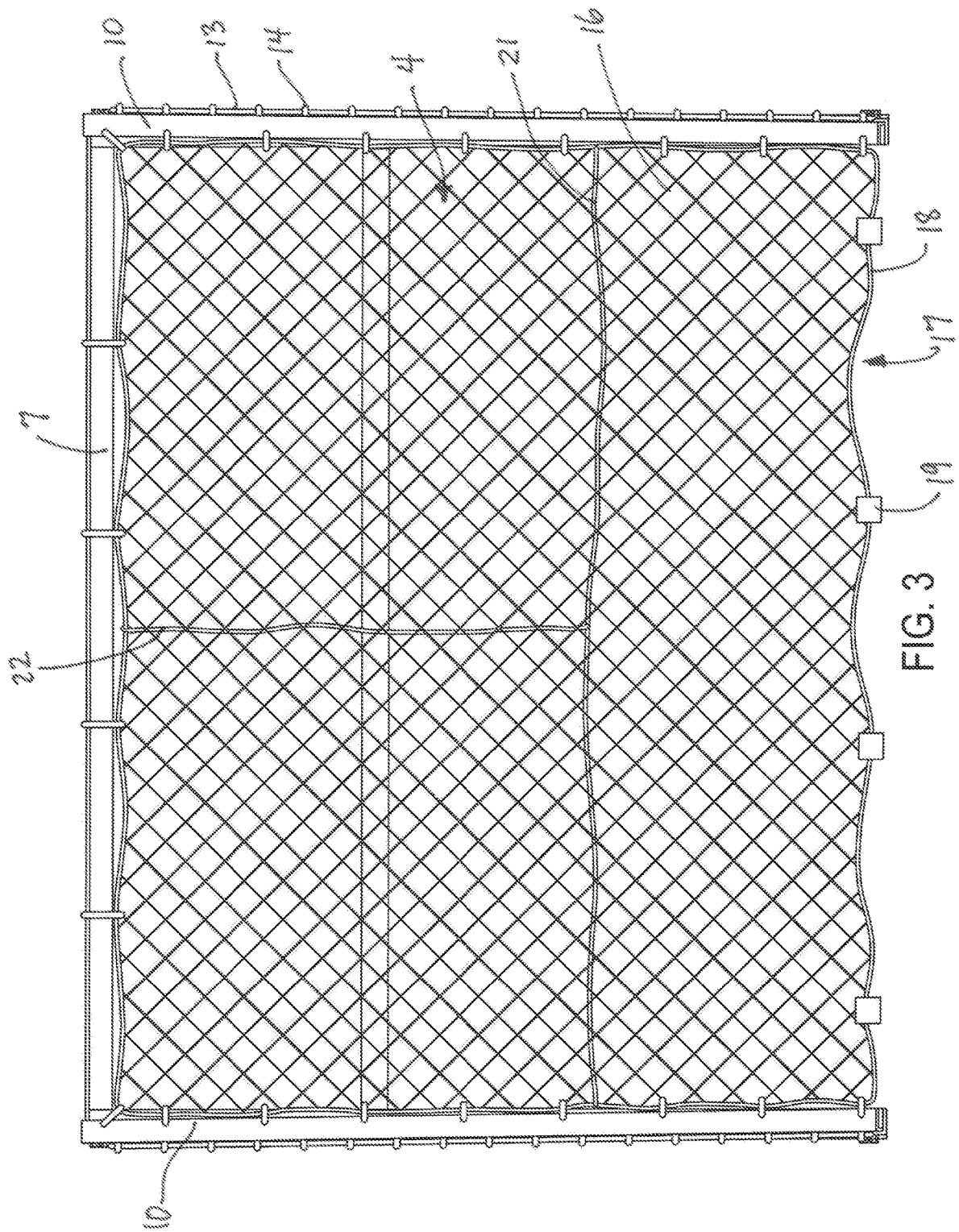
FIG. 3 shows a front view of the hog gate of FIG. 1.
Figure 4:
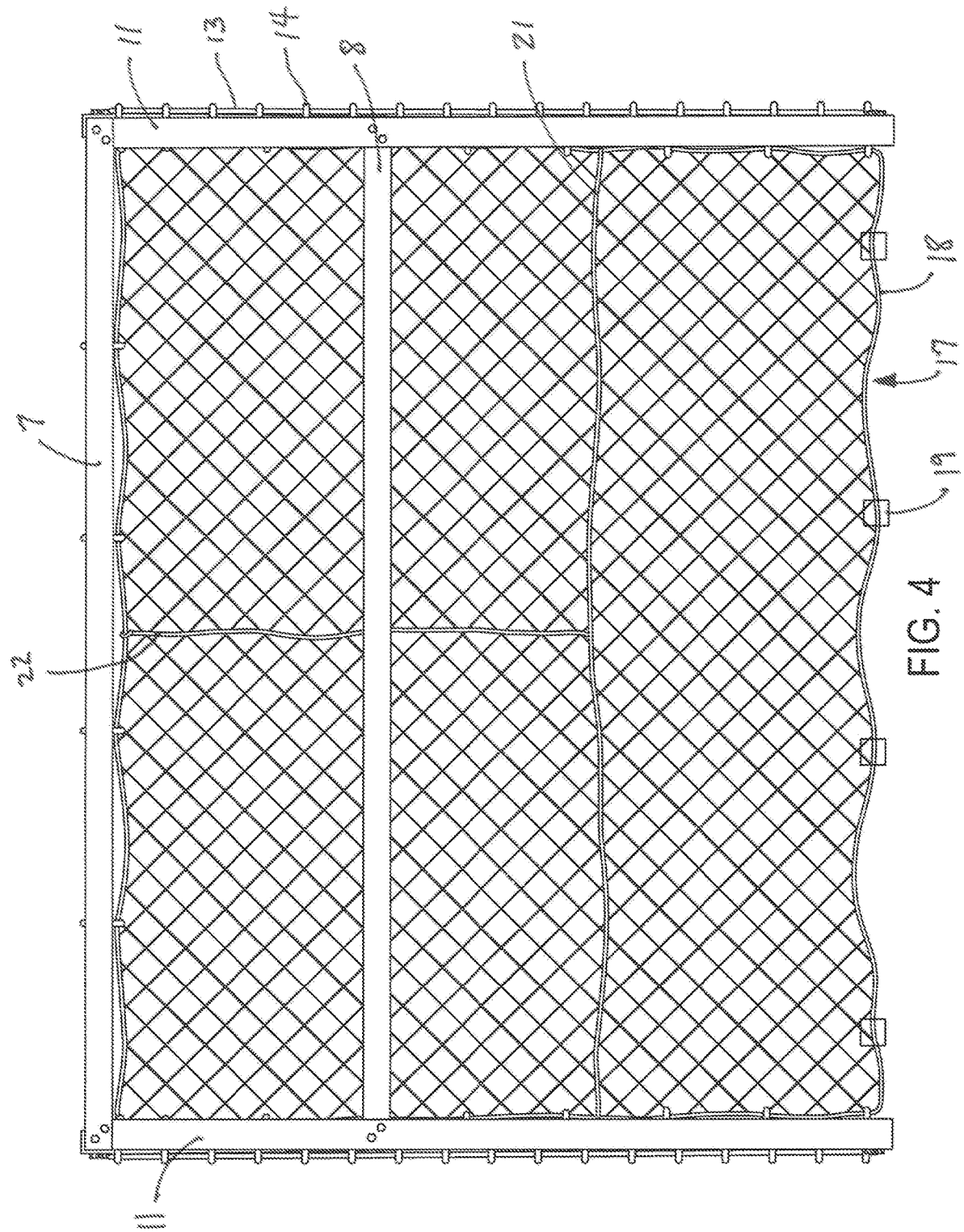
FIG. 4 shows a rear view of the hog gate of FIG. 1.
Figure 5:
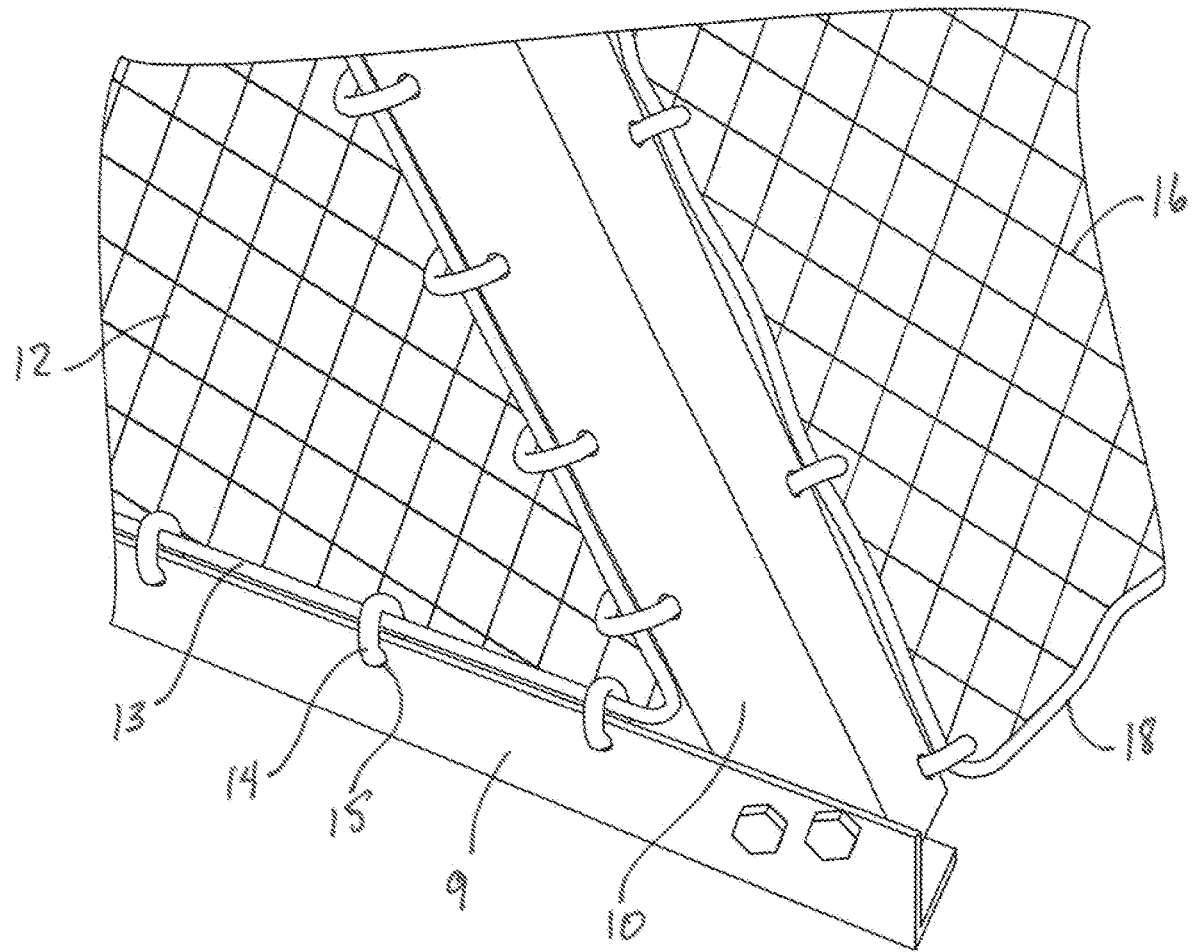
FIG. 5 shows a detailed view of a front bottom corner of the hog gate of FIG. 1.
Figure 6:
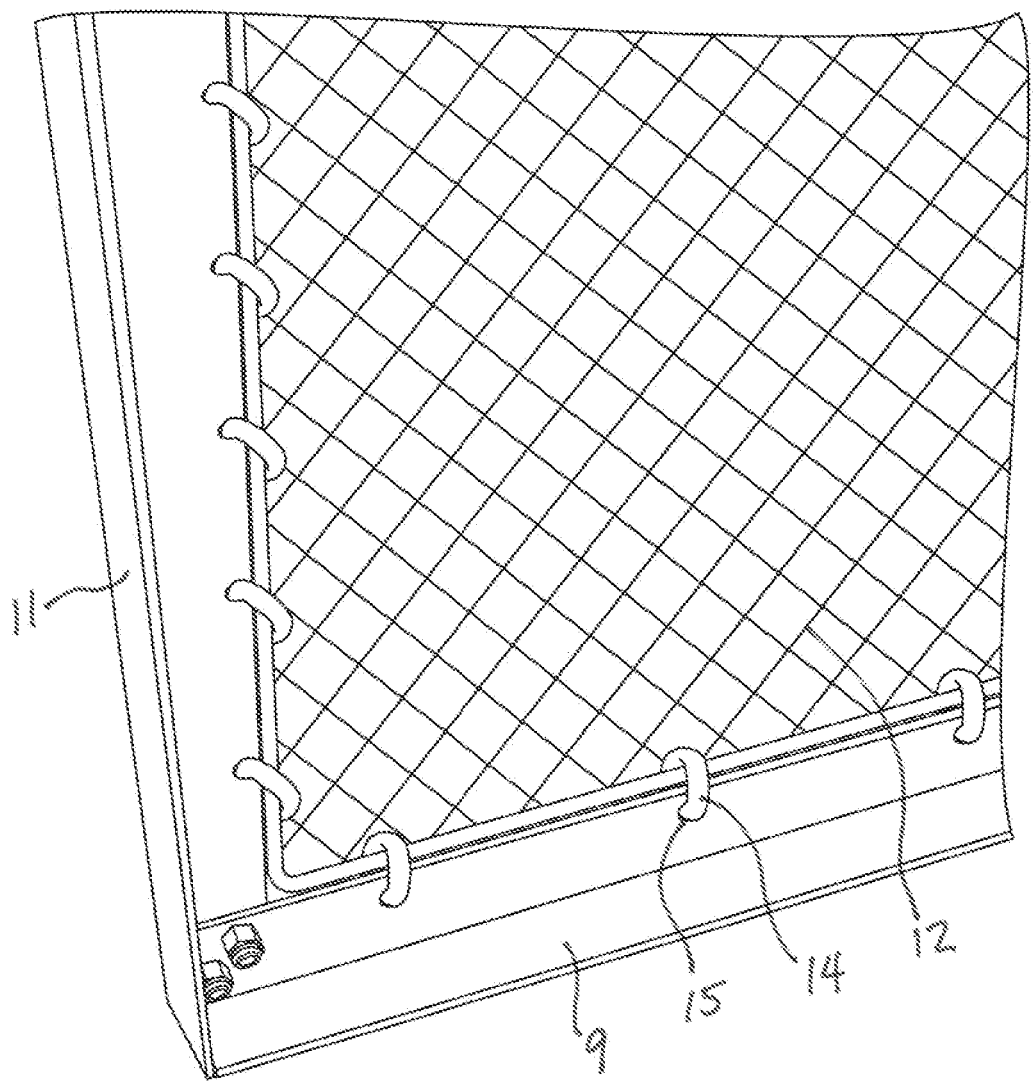
FIG. 6 shows a detailed view of a rear bottom corner of the hog gate of FIG. 1.
Figure 7:
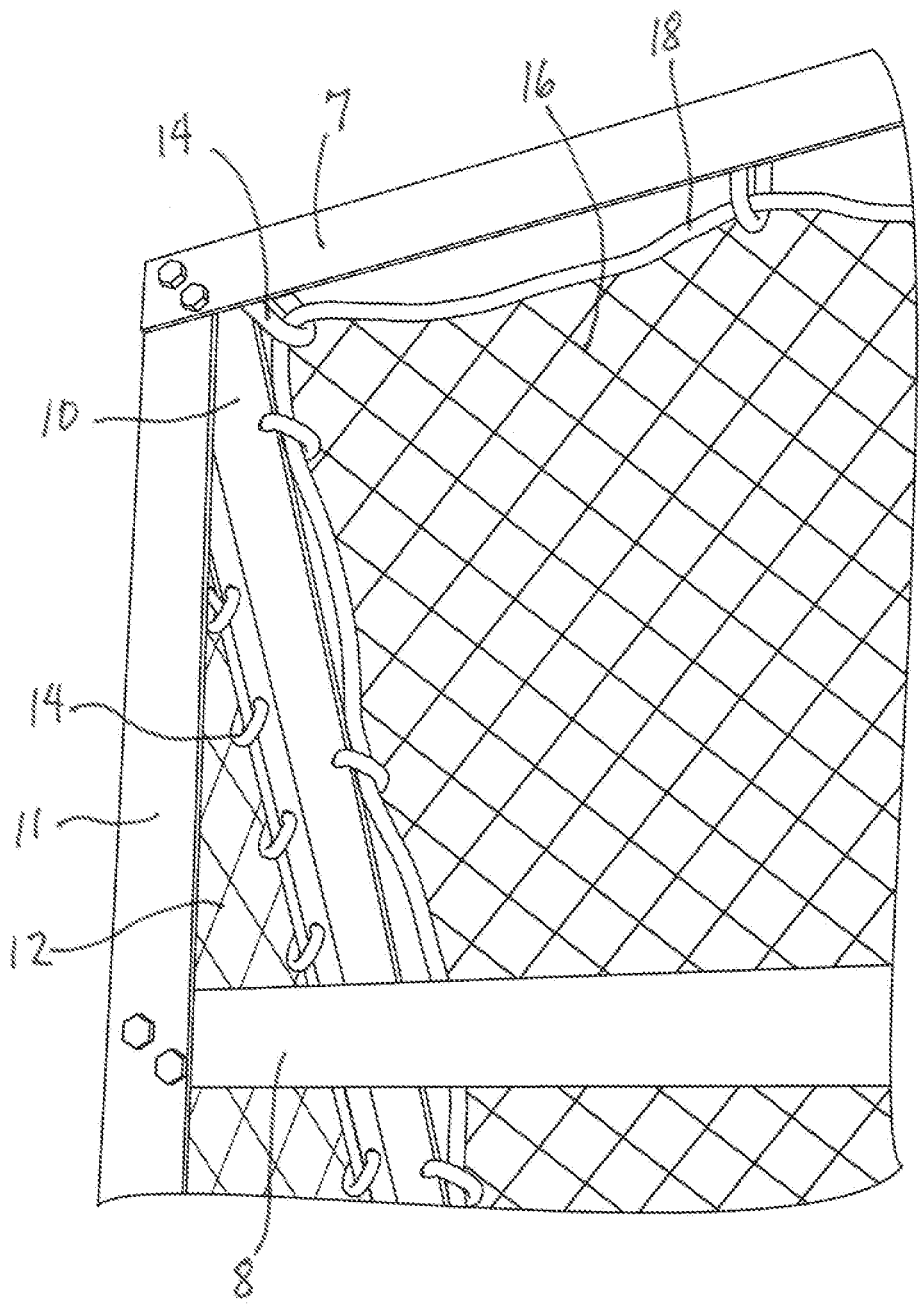
FIG. 7 shows a detailed view of a rear top corner of the hog gate of FIG. 1.

In order to more fully support the front netting assembly 4, the front netting assembly 4 preferably includes a first auxiliary rope 22 securely extending from and attached to the front netting rope 18 near the top member 7 in a roughly vertical orientation to a point approximately two to three feet above the ground, as shown more clearly in FIGS. 3 and 4. This height roughly corresponds to the average height of most full grown hogs and can be raised or lowered slightly without much effect on the effectiveness of the gate 1. A second auxiliary rope 21 in a roughly horizontal orientation securely extends between and is attached to the front netting rope 18 adjacent to the side frame assemblies 5, 6 and is securely fastened to a lower end of the first auxiliary rope 22. Both of these auxiliary ropes 21, 22 are weaved through the openings of the netting and can be further secured to such netting by clamps or similar fasteners for strength. Thus, the first and second auxiliary ropes 21, 22 form an inverted "T" which strengthens the upper region of the front netting assembly 4. This arrangement further allows the lower region of the front netting assembly 4 to remain loosely gathered along the bottom edge 17 for the reasons explained above.

Figure 2:
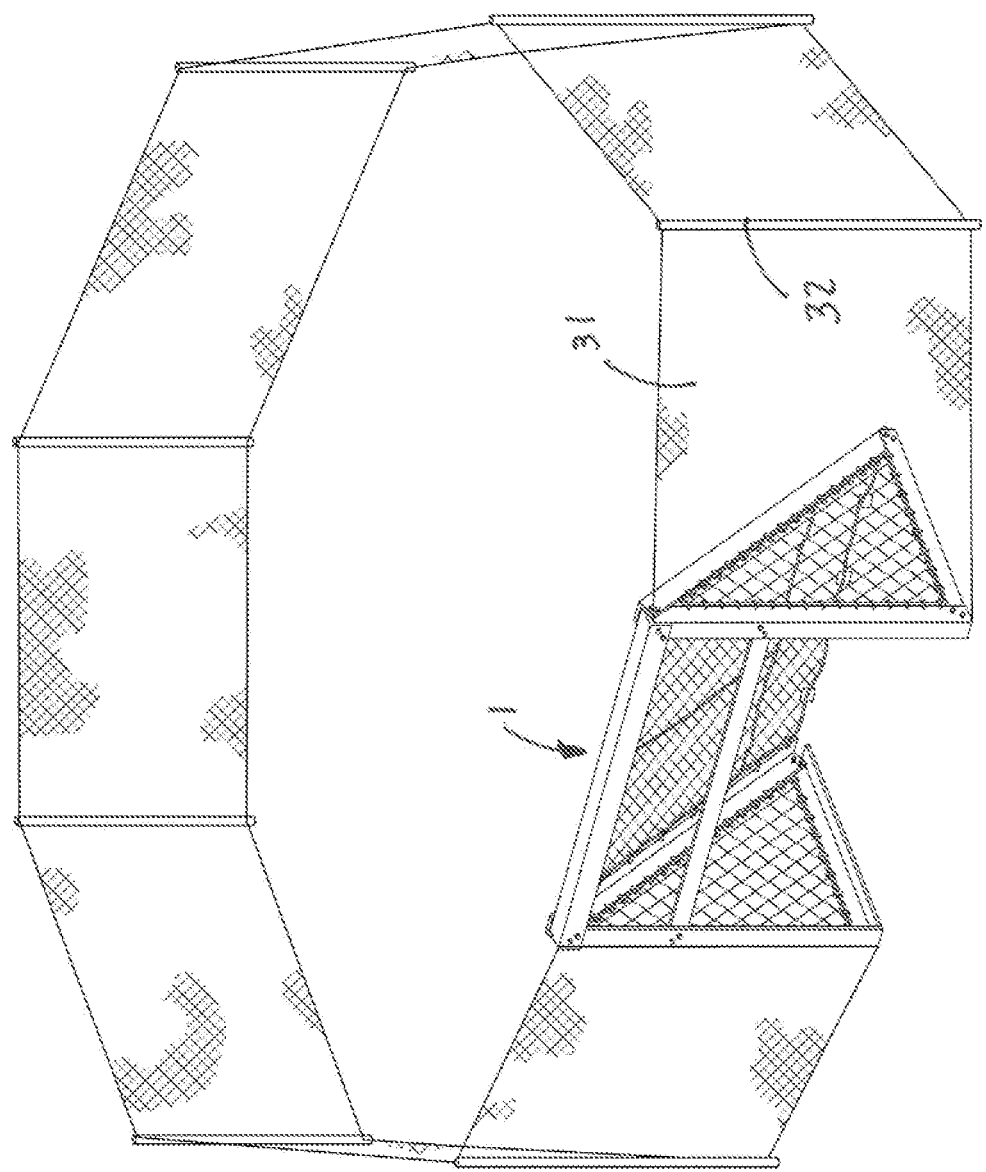
FIG. 2 shows a view of the hog gate of FIG. 1 in an installed assembly with a fence or trapping enclosure.

As shown in FIG. 2, the gate 1 can be placed in position and attached to conventional metal fencing 31 and posts 32. Once a few feral hogs begin to enter the gate 1, the other hogs will become comfortable entering the gate 1 as well until most or all of the hogs in the pack are contained within the trap enclosure.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only, and the scope of the present invention is to be limited only by the following claims.

The invention claimed is:

1. A gate for a feral hog trap, comprising:
   (a) a frame, comprising:
      a. opposing side frame assemblies having a triangular shape and including a bottom member, a front member, and a rear member;
      b. a top member extending between the side frame assemblies; and
      c. a reinforcing member extending between the side frame assemblies and below the top member;
   (b) a side netting assembly secured across each of the side frame assemblies, wherein the side netting assembly includes:
      a. a flexible side netting material having a plurality of openings, wherein the side netting material has a triangular shape adapted to extend between the bottom member, the front member, and the rear member of each of the side frame assemblies; and
      b. a side netting rope weaved into the openings of the side netting material, wherein the side netting rope is secured to the bottom member, the front member, and the rear member of each of the side frame assemblies;
   (c) a front netting assembly secured across the side frame assemblies, wherein the front netting assembly includes:
      a. a flexible front netting material having a plurality of openings, wherein the front netting material has a rectangular shape adapted to extend between the front members of the side frame assemblies and the top member;
      b. a front netting rope weaved into the openings of the front netting material, wherein the front netting rope is secured to the top member and the front members of the side frame assemblies; and
      c. wherein the front netting assembly includes a bottom edge in contact with the ground.

2. The gate of claim 1, wherein the side netting rope of each of the side netting assemblies is secured to the respective side frame assemblies using a plurality of clamps engaged with holes formed into the bottom member, the front member, and the rear member.

3. The gate of claim 1, wherein the front netting assembly is formed to allow the bottom edge to remain loosely gathered and in contact with the ground.

4. The gate of claim 1, wherein the bottom edge of the front netting assembly includes additional weighted material secured to the front netting rope sufficient to keep the bottom edge in contact with the ground.

5. The gate of claim 1, further including a first auxiliary rope securely extending from the front netting rope near the top member to a point approximately two to three feet above the ground, and a second auxiliary rope securely extending between the front netting rope adjacent to the side frame assemblies and securely fastened to a lower end of the first auxiliary rope.

6. The gate of claim 1, wherein the top member, the reinforcing member, the bottom members, the front members, and rear members are fastened with bolts to form the frame.

* * * * *